United States Patent
Bosch

(10) Patent No.: US 8,981,703 B2
(45) Date of Patent: Mar. 17, 2015

(54) MOTOR SYSTEM HAVING AN ELECTRONICALLY COMMUTATED ELECTRIC MACHINE

(75) Inventor: Volker Bosch, Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 13/581,645

(22) PCT Filed: Jan. 25, 2011

(86) PCT No.: PCT/EP2011/050932
§ 371 (c)(1),
(2), (4) Date: Nov. 12, 2012

(87) PCT Pub. No.: WO2011/110375
PCT Pub. Date: Sep. 15, 2011

(65) Prior Publication Data
US 2013/0043821 A1 Feb. 21, 2013

(30) Foreign Application Priority Data
Mar. 8, 2010 (DE) .......................... 10 2010 002 666

(51) Int. Cl.
*H02P 6/00* (2006.01)
*H02P 6/14* (2006.01)

(52) U.S. Cl.
CPC ................ *H02P 6/142* (2013.01); *H02P 6/003* (2013.01); *H02P 6/145* (2013.01)
USPC .................... 318/721; 318/400.4; 318/400.12; 318/432

(58) Field of Classification Search
CPC .................................. H02P 1/00; G05B 19/19
USPC ................. 318/652, 400.01, 400.02, 400.14, 318/400.15, 721, 799, 701, 727, 430, 432, 318/437, 560, 400.12, 400.4, 400.35, 602; 708/235
See application file for complete search history.

(56) References Cited

U.S. PATENT DOCUMENTS

| | | | | |
|---|---|---|---|---|
| 4,857,814 A | * | 8/1989 | Duncan | ......................... 318/281 |
| 5,200,675 A | * | 4/1993 | Woo | .......................... 318/400.14 |
| 5,886,489 A | | 3/1999 | Rowan et al. | |

(Continued)

FOREIGN PATENT DOCUMENTS

| | | |
|---|---|---|
| DE | 38 19 064 | 12/1989 |
| DE | 197 00 479 | 7/1997 |

(Continued)

OTHER PUBLICATIONS

International Search Report for PCT/EP2011/050932, dated Jun. 27, 2012.

*Primary Examiner* — Antony M Paul
(74) *Attorney, Agent, or Firm* — Kenyon & Kenyon LLP

(57) ABSTRACT

A system for operating an electric machine includes: a rotor position sensor to provide a rotor position indication as a function of a rotor position angular range which indicates the position of a rotor of the electric machine; a control unit designed to associate in each case a commutation angular range, which indicates a certain control state for the stator coils, with one or more of the rotor position indications, so that a change in the commutation angular range is triggered by a change in the rotor position indication, and to change an association scheme of the associations between the rotor position indications and the respective commutation ranges as a function of a predefined rotational direction indication which indicates the desired rotational direction.

8 Claims, 7 Drawing Sheets

(56) References Cited

U.S. PATENT DOCUMENTS 6,078,152 A * 6/2000 Dieterle et al. ............... 318/264
6,967,459 B2 * 11/2005 Hahn et al. .................... 318/599

FOREIGN PATENT DOCUMENTS

| | | |
|---|---|---|
| DE | 101 41 125 | 6/2002 |
| JP | 11 332297 | 11/1999 |

* cited by examiner

Fig. 6a

| $\alpha_{el}$ | 0° – 60° | 60° – 120° | 120° – 180° | 180° – 240° | 240° – 300° | 300° – 360° |
|---|---|---|---|---|---|---|
| T1 | on  | on  | off | off | off | off |
| T2 | off | on  | on  | off | off | off |
| T3 | off | off | on  | on  | off | off |
| T4 | off | off | off | on  | on  | off |
| T5 | off | off | off | off | on  | on  |
| T6 | on  | off | off | off | off | on  |

(columns span KW)

Fig. 6b

| $\alpha_{el}$ | 0° – 60° | 60° – 120° | 120° – 180° | 180° – 240° | 240° – 300° | 300° – 360° |
|---|---|---|---|---|---|---|
| T1 | on  | off | off | off | off | on  |
| T2 | on  | on  | off | off | off | off |
| T3 | off | on  | on  | off | off | off |
| T4 | off | off | on  | on  | off | off |
| T5 | off | off | off | on  | on  | off |
| T6 | off | off | off | off | on  | on  |

MOTOR SYSTEM HAVING AN ELECTRONICALLY COMMUTATED ELECTRIC MACHINE

BACKGROUND OF THE INVENTION

1. Field of the Invention

The present invention relates to electronically commutated electric machines in which the commutation is carried out with the aid of simple and cost-effective rotor position sensors.

2. Description of the Related Art

Electronically commutated electric machines, in particular electric motors, in combination with rotor position sensors have the advantage that, in contrast to sensorless methods for determining the rotor position, such as the so-called back EMF method, they allow the electric motor to be immediately started with a maximum torque, and allow this torque to be maintained even when a rotor is locked.

In three-phase electric machines, the rotor position sensors that are usually used have three sensor elements, for example Hall sensor elements, which detect the field of a radially oriented sensor magnet situated on the rotor of the electric machine, i.e., the stray field of permanent magnets situated on or in the rotor. Optical methods using so-called sensor disks may also be used for this purpose.

For cost reasons, the rotor position sensors have the simplest possible design, and therefore have only a low resolution. As a rule, the minimum resolution must correspond to 360° divided by the number of phases m and by the number of pairs of poles p of the rotor of the electric machine. For the commutation, the stator coils of the electric machine are controlled as a function of the detected rotor position, a commutation generally occurring when the rotor position signal changes. The rotor position sensors are usually oriented in such a way that a control unit, which carries out the control of the stator coils as a direct function of the rotor position signal, controls the stator coils in such a way that the stator magnetomotive force (stator magnetization) on average is oriented perpendicularly with respect to the rotor magnetomotive force (rotor magnetization). The angular range of the active current feed is 360° divided by the product of the number of phases and the number of pairs of poles. For a two-pole machine, this results in an angular range of 60°, and therefore, six commutation operations per rotor revolution.

Since the torque of an electric machine is proportional to the vector product of the electrical magnetomotive force and the exciter flux density, the maximum torque is generated at an electrically effective angle of 90° between the stator magnetomotive force and the rotor flux density. The electrically effective angle is computed from the mechanical angle divided by the number of pairs of poles of the electric machine. Thus, to generate the maximum torque, an electrically effective angle of 90°, averaged over time, must be present between the magnetomotive force and the exciter flux density. A stator coil is thus connected to the voltage source at the exact point in time when its magnetomotive force axis has an electrically effective angle of 90° plus an electrically effective angle of 60° (against the rotational direction), which results from one-half the width of a commutation interval, relative to a magnetization axis (D axis) of a pair of poles of the rotor, and is disconnected from the voltage source at an angle of 90° minus an electrically effective angle of 60° (against the rotational direction) which results from one-half the width of a commutation interval.

This type of control provides good results for electronically commutated electric machines having magnetically symmetrical rotors, and is usually used in particular when the electric machine is to operate in both rotational directions and over a wide rotational speed range.

If the electric machine has a rotor with embedded magnets, instead of the usual design having shell- or ring-shaped surface magnets, the common square or loaf-shaped magnets are present inside the rotor yoke. This results in a magnetic asymmetry of the electric machine, since the permeance in the direction of the magnetization (D axis) is less than in a direction transverse thereto (Q axis). This results in an inductance of the electric machine which is a function of the rotor position. The stator coil, whose magnetic axis coincides with the D axis of the rotor, has the minimum inductance, and the phase conductor, whose magnetization axis coincides with the Q axis of the rotor (which is offset by a 90° electrical rotor position with respect to the D axis), has the maximum inductance.

For these types of electric machines having rotors with embedded permanent magnets, the above-mentioned type of control is not optimal. At the switch-on time of a phase conductor, its inductance is low, subsequently reaches the maximum value when the stator magnetomotive force is oriented perpendicularly with respect to the rotor magnetomotive force, and subsequently drops once again. The drop in the inductance at the switch-off time of the phase conductor causes a sharp rise in current in this phase conductor, resulting in an intense load on the semiconductor circuit elements and which is thus also associated with high switching losses. The resulting current pattern for this type of electric machine has an effective value of the current, which is high in relation to the average value of the current, which is largely responsible for the losses.

A simple remedy results from an early commutation, which is carried out, for example, by rotating the rotor position sensor by a defined angle against a predetermined rotational direction. The increase in current during switching, and thus the load on the semiconductor circuit elements as well as the switching losses, may be reduced in this way. However, this is applicable only for electric machines which are operated in only one rotational direction. On the other hand, if the electric machine is to be operated in both rotational directions, symmetrical precommutation may thus be achieved in both rotational directions. When the rotor position sensor on the electric machine is rotated to achieve a lead in one rotational direction, this always results in a lag in the opposite rotational direction.

According to the present related art, this precommutation is initiated on the one hand by using rotor position sensors having a much higher resolution than for the rotor position sensors according to the minimum requirements for the resolution, i.e., a resolution of 360° divided by the product of the number of phases and the number of pairs of poles. On the other hand, an adjustable delay element is used which achieves the desired precommutation as the result of a delay in the commutation signal, which is a function of the rotational speed. The delay element may also be implemented as a software routine in a microcontroller. However, both measures increase the complexity of circuitry and programming, thus reducing the reliability.

The object of the present invention, therefore, is to provide a system for operating an electric machine, a motor system, and a method for operating an electric machine which allows simple implementation of an operation of an electronically commutated electric machine, having magnetically asymmetrical rotors, in both rotational directions.

BRIEF SUMMARY OF THE INVENTION

According to a first aspect, a system for operating an electronically commutated electric machine is provided. The system includes:

a rotor position sensor to be situated on the electric machine in order to provide a rotor position indication as a function of a rotor position angular range which indicates the position of a rotor of the electric machine, a change which occurs between rotor position angular ranges when the rotor moves, resulting in a change in the rotor position indication;

a control unit which is designed to associate in each case a commutation angular range, which indicates a certain control state for the stator coils, with one or more of the rotor position indications, so that a change in the commutation angular range is triggered by a change in the rotor position indication, and to change an association scheme of the associations between the rotor position indications and the respective commutation ranges as a function of a predefined rotational direction indication which indicates the desired rotational direction.

One concept of the present invention is to reduce the complexity in the control unit for controlling the electric machine for operation in opposite rotational directions, in that only the association between the rotor position indications and the respective commutation ranges is changed as a function of a predefined rotational direction indication which indicates a desired rotational direction.

In addition, a maximum torque rotor position may be defined in each of the commutation angular ranges which indicates a rotor position for which the control state associated with the particular commutation angular range brings about a stator magnetization having a direction that is perpendicular to a direction of a rotor magnetization, the commutation angular ranges being situated between the maximum torque rotor positions, the control beginning at a rotor position which is situated around a commutation angular range which, with respect to the rotational direction, precedes the maximum torque rotor position of the particular control state, and the control ending at a rotor position which corresponds to the maximum torque rotor position.

A leading commutation may thus be provided for opposite rotational directions for an electronically commutated electric machine whose rotor has a magnetically asymmetrical design, such as electric machines with embedded magnets. By providing a precommutation, with regard to the commutation range which is symmetrically situated around the maximum torque rotor position, by an electrical rotor position angle which corresponds to one-half the width of the commutation interval of 360° divided by the product of the number of phases and the number of pairs of poles, a precommutation may be achieved without the need for additional components. It is only necessary to appropriately adjust the configuration of the rotor position sensor on the electric machine so that the provision of additional delay elements or the like for adjusting the rotor position indication may be avoided. With very little additional complexity overall, it is thus possible to achieve a precommutation for electric machines having magnetically asymmetrical rotors for opposite directions of movement.

According to one specific embodiment, the rotor position sensor may have a resolution of the rotor position so that each of the rotor angular ranges is associated with one of the commutation angular ranges. Alternatively, the rotor position sensor may have a resolution of the rotor position so that in each case multiple rotor angular ranges are associated with one of the commutation ranges.

In addition, the control unit may be designed to carry out the association of the one or multiple rotor position indication (s) with the commutation angular range with the aid of a look-up table, and to shift the association of the one or multiple rotor position indication(s) with the particular commutation angular range by one or multiple commutation angular range(s) against the rotational direction as a function of the rotational direction indication.

Additionally or alternatively, the control unit may be designed to achieve the shift of the association of the one or multiple rotor position indication(s) with the particular commutation angular range against the rotational direction as a function of the rotational direction indication by modifying the rotor position indication.

It may be provided that the rotor position indication is provided by multiple rotor position signals, the control unit also having one or multiple inverter(s) for inverting one or more of the rotor position signals, and a multiplexer for a commutation of the inverted rotor position signals in order to provide the modified rotor position indication.

According to another aspect, a motor system is provided. The motor system includes:

an electric machine having a stator winding which is situated on a stator of the electric machine and which has multiple stator coils, and a rotor which is drivable by an alternating current feed to the stator coils; and the above-mentioned system.

According to another aspect, a method for operating an electric machine is provided, the electric machine including a stator winding which is situated on a stator of the electric machine and which has multiple stator coils, and a rotor which is drivable by an alternating current feed to the stator coils;

the method having the following steps:

providing a rotor position indication as a function of a rotor position angular range which indicates the position of the rotor, a change which occurs between rotor position angular ranges when the rotor moves, resulting in a change in the rotor position indication;

associating a commutation angular range, which indicates a certain control state for the stator coils, with one or more of the rotor position indications, so that a change in the commutation angular range is triggered by a change in the rotor position indication, and changing the associations between the rotor position indications and the respective commutation ranges as a function of a predefined rotational direction indication which indicates the desired rotational direction.

BRIEF DESCRIPTION OF THE DRAWINGS

FIGS. 6*a* and 6*b* show tables for illustrating the switching states of the power switching elements of the electric machine in FIGS. 1 through 3, for two different rotational directions.

DETAILED DESCRIPTION OF THE INVENTION

Figure 1:
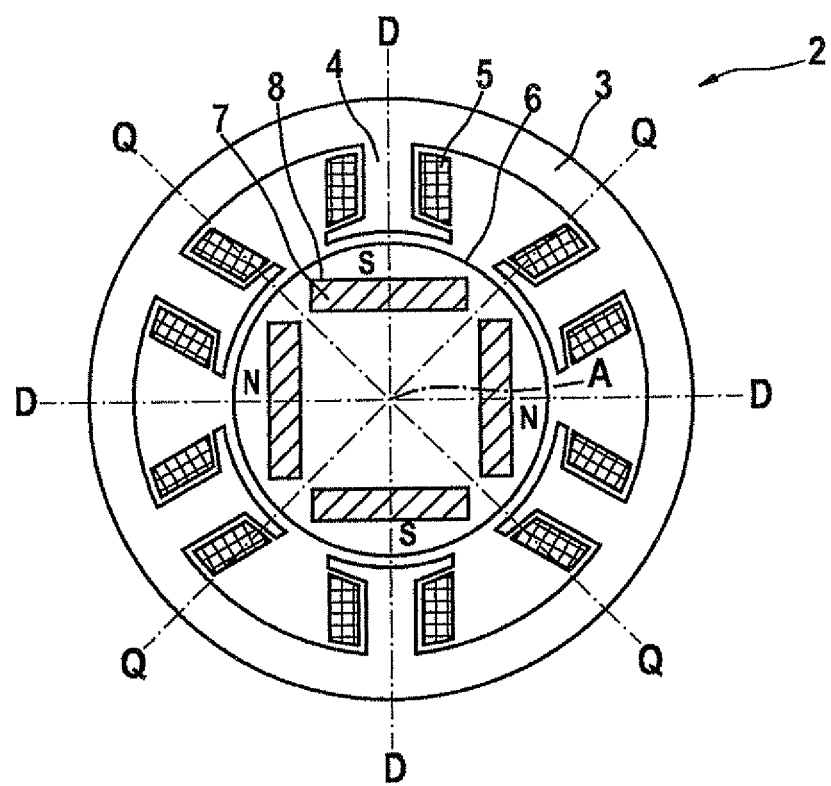
FIG. 1 shows a cross-sectional illustration of a three-phase electric machine having two pairs of rotor poles.

FIG. 1 shows a cross-sectional illustration of a three-phase synchronous machine having two pairs of rotor poles. Synchronous machine 2 is part of a motor system 1, and includes a stator 3 which is provided with stator teeth 4. Stator teeth 4 are wound with stator coils 5 which form the stator winding. In the exemplary embodiment of stator 3 shown, stator teeth 4 are directed inwardly. Stator 3 and stator teeth 4 define a cylindrical cavity in which a rotor 6 is situated in a rotatable manner.

In the exemplary embodiment shown, rotor 6 is provided with permanent magnets 7 which are arranged in such a way that four rotor poles are formed. Permanent magnets 7 are situated in pockets 8 inside cylindrical rotor 6, and in each case have a direction of magnetization that extends radially with respect to a longitudinal axis A of rotor 6 and parallel to associated rotor axis d. Such a configuration results in a rotor having two pairs of rotor poles. Permanent magnets 7 are arranged in such a way that in the peripheral direction, adjacent permanent magnets have a polarization that is opposite to that in the radial direction. The directions of magnetization of the permanent magnets form D axes of the rotor, while directions that are offset with respect to same by an electrical rotor position angle of 90° are referred to as Q axes.

Figure 2:
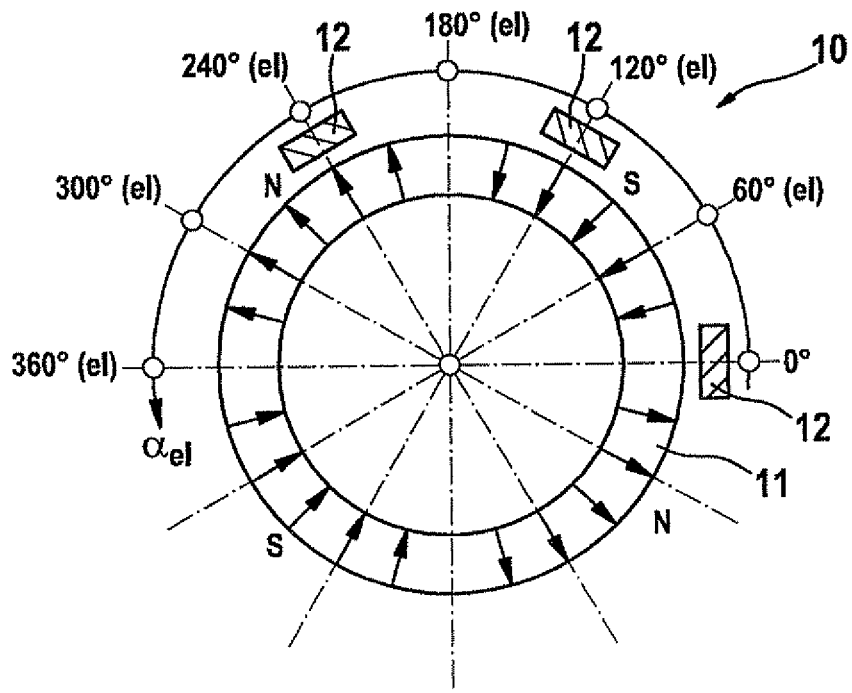
FIG. 2 shows a schematic illustration of a rotor position sensor for use with the electric machine in FIG. 1.

FIG. 2 illustrates a rotor position sensor 10 which is axially connected, i.e., directly coupled, to rotor 6 of electric machine 2, so that the absolute position of rotor 6 and the rotational speed of rotor 6 may be detected with the aid of rotor position sensor 10. The mechanical rotor position or mechanical rotor position angle is generally detected as the absolute position. An electrical rotor position or mechanical rotor position angle results from the mechanical rotor position divided by the number of pairs of poles (which corresponds to two in the present exemplary embodiment).

Rotor position sensor 10 may have a ring magnet 11 which is situated on an axial extension of rotor 6. Ring magnet 11 has areas which have different directions of magnetization, adjacent areas having a magnetization opposite to one another. The number of areas of alternating magnetization in ring magnet 11 determines the resolution of rotor position sensor 10. In the present exemplary embodiment, ring magnet 11 has four magnetization areas. Magnetic field detectors 12 such as Hall sensors or the like are situated, offset by 60° relative to one another, around the ring magnet in order to provide a resolution which subdivides a complete revolution of the electric machine into angular ranges. Rotor position sensor 10 signals the particular rotor position angular range via a rotor position indication. Another specific embodiment may include a disk-shaped magnet whose axial end face is magnetized. In that case, the sensors are axially situated next to the magnet disk.

The resolution of rotor position sensor 10 is adapted to the design of electric machine 2. The minimum required resolution, i.e., the smallest number of rotor position ranges into which a complete revolution of rotor 6 is subdivided, is the number of successive control patterns to be applied for operating electric machine 2 for one rotor revolution. However, it is also possible for the resolution of rotor position sensor 10 to be an integral multiple of the minimum resolution.

Figure 3:
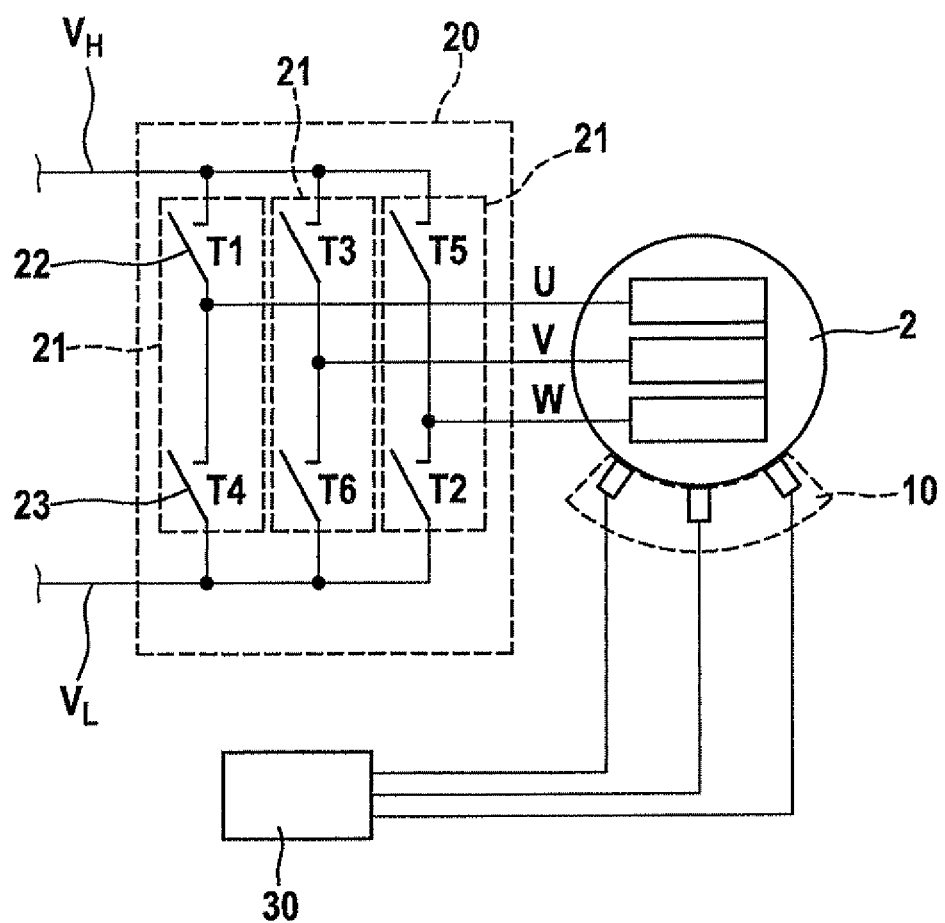
FIG. 3 shows a driver circuit for controlling the electric machine in FIG. 1.

FIG. 3 illustrates one example of a power output stage 20 which is controlled with the aid of a control unit 30. Power output stage 20 has a number of power switching elements 21, for example in the form of an inverter circuit (also referred to as a half bridge circuit), which corresponds to the number of phases of electric machine 2. Each power switching element has a first semiconductor switch 22 which is connected to a high supply potential $V_H$, and a second semiconductor switch 23 which is connected to a low supply potential $V_L$. Semiconductor switches 22, 23 may be designed as power semiconductor switches, for example in the form of IGETs, IGCTs, thyristors, power MOSFETs, and the like.

In addition, a control unit 30 is provided which with the aid of a corresponding control signal controls each of semiconductor switches 22, 23 so that the semiconductor switch is open (electrically nonconductive) or closed (electrically conductive). Control unit 30 is generally controlled in such a way that one of first semiconductor switches 22 of one of power switching elements 21 is closed, while the other first semiconductor switches 22 are open, and a second semiconductor switch 23 of another of power switching elements 21 is closed while the other second semiconductor switches 23 are open. At least two stator coils 5 (phase conductors) of electric machine 2 may thus always be energized in a commutation angular range. The commutation angular range corresponds to a range of the rotor position angle, and is defined as the overall range of rotor 6 in which a certain stator coil 5 is energized by appropriately controlling semiconductor switches 22, 23 of power switching elements 21.

As described at the outset, rotor position sensor 10 is usually oriented on electric machine 2 in such a way that in conjunction with control unit 30, the respective stator coils 5 are controlled by the control pattern in such a way that during operation, the resultant stator magnetomotive force on average is oriented perpendicularly with respect to the rotor magnetomotive force. The rotor position for which the stator magnetomotive force (stator magnetization) extends perpendicularly with respect to the rotor magnetomotive force (rotor magnetization) relative to the electrical rotor position causes the highest drive torque, and is referred to below as the maximum torque rotor position.

In combination with the known predefined positioning of rotor position sensor 10 on rotor 6 of electric machine 2, driver circuit 20 may be controlled in such a way that the stator magnetomotive force on average is oriented perpendicularly with respect to the rotor magnetomotive force. In other words, a commutation angular range is situated symmetrically around the maximum torque rotor position. The commutation angular range then corresponds to a range which is determined in each case between two successive centers of two successive maximum torque rotor positions.

To achieve this, due to the low resolution, rotor position sensor 10 is frequently situated in a defined manner on rotor 6 of electric machine 2. Due to its limited resolution, rotor position sensor 10 provides a rotor position indication which indicates a rotor position angular range. The rotor position angular ranges generally correspond to angular ranges which correspond to the minimum resolution angle of rotor position sensor 10. Rotor position sensor 10 is situated on rotor 6 in such a way that in each case a transition between successive commutation ranges coincides with an alternation between rotor position angular ranges of rotor position sensor 10.

In electric machines for which no magnetic symmetry is present due to the design of rotor 6, since the permeance of permanent magnets 8 is lower than the material of which rotor 6 is made, as a result the inductance of electric machine 2 is dependent on the rotor position. Stator coil 5, whose magnetic axis is linked to a magnetization axis (D axis) of a pair of rotor poles of rotor 6, then has a minimum inductance, while stator coil 5 whose magnetic axis is linked to the Q axis of rotor 6 (offset by a 90° electrical rotor position with respect to the D axis) has the maximum inductance. As a result, for the above-described commutation of stator coils 5, at the switch-on time of stator coils 5 their resultant inductance is low, then reaches the maximum value after rotor 6 moves to the maximum torque rotor position with respect to controlled stator coil 5, and subsequently drops once again upon further movement of rotor 6. The drop in inductance at the switch-off time of stator coil 5 causes a sharp rise in current in stator coil 5, resulting in an intense load on semiconductor switches 22, 23 in power output stage 20, and which is thus also associated with high switching losses.

Figure 4A:
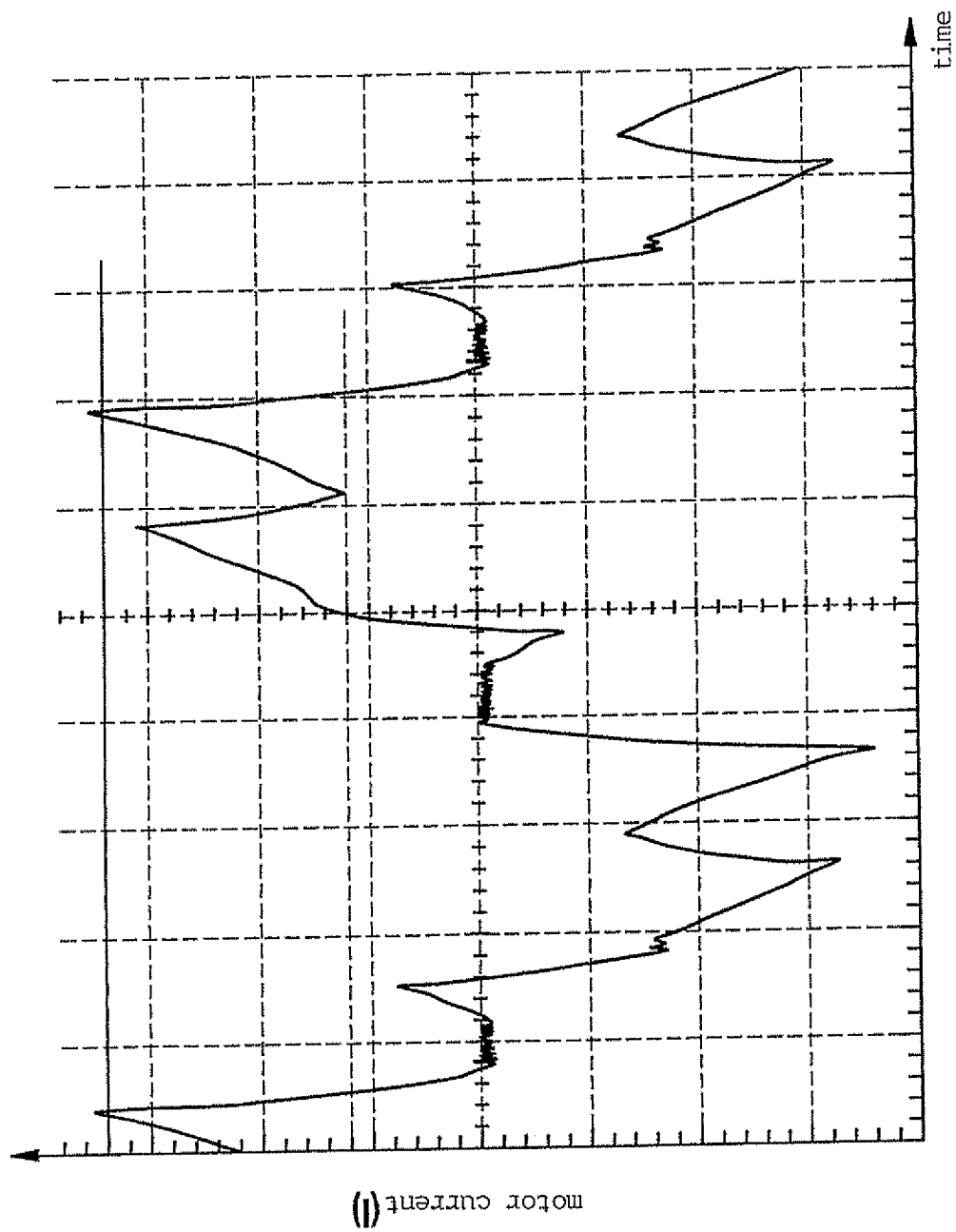
FIGS. 4*a* and 4*b* show variations over time of the phase current of a phase conductor for normal commutation and leading commutation, respectively, of a machine having magnetically asymmetrical rotors according to FIG. 1.
Figure 4B:
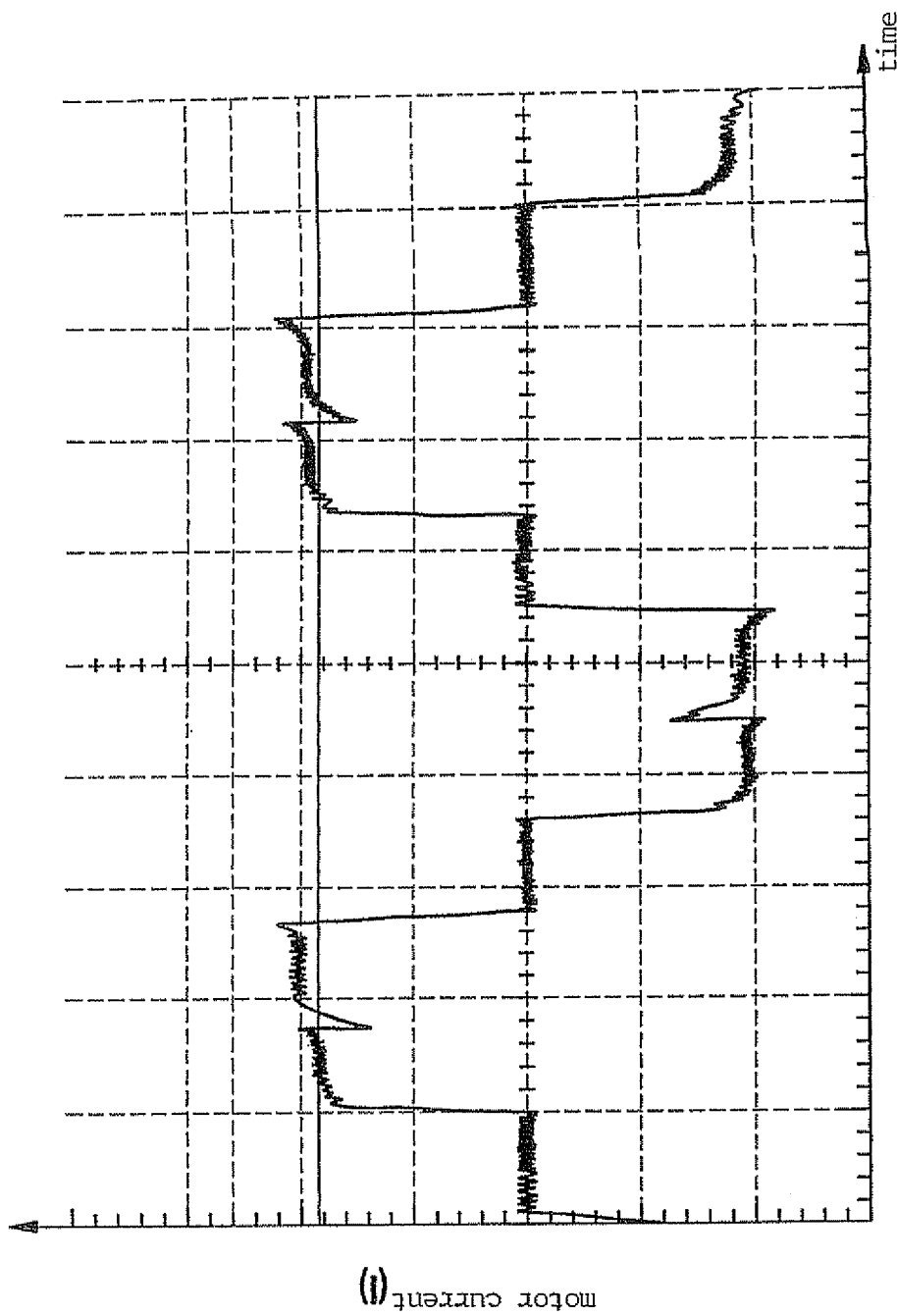

This effect may be reduced by shifting the commutation angular range with regard to the maximum torque rotor position from the symmetry against the rotational direction of rotor 6. FIG. 4a illustrates a variation over time of the motor current, without the shift of the rotor position in the commutation angular range. It is apparent that the relationship between the effective value, which results from squaring the variation of the current over time and which is responsible for the power losses, and the associated fundamental mode, which is crucial for the torques, is not optimal. In comparison, FIG. 4b illustrates a variation over time of the motor current which results when the commutation angular range is shifted against the rotational direction.

In particular, for this purpose rotor position sensor 10 may be rotated by a defined rotor position angle in a predefined rotational direction with respect to electric machine 2. A variation over time of the motor current which is improved with regard to the power losses may thus be achieved without changing the control by control unit 30.

Figure 5:
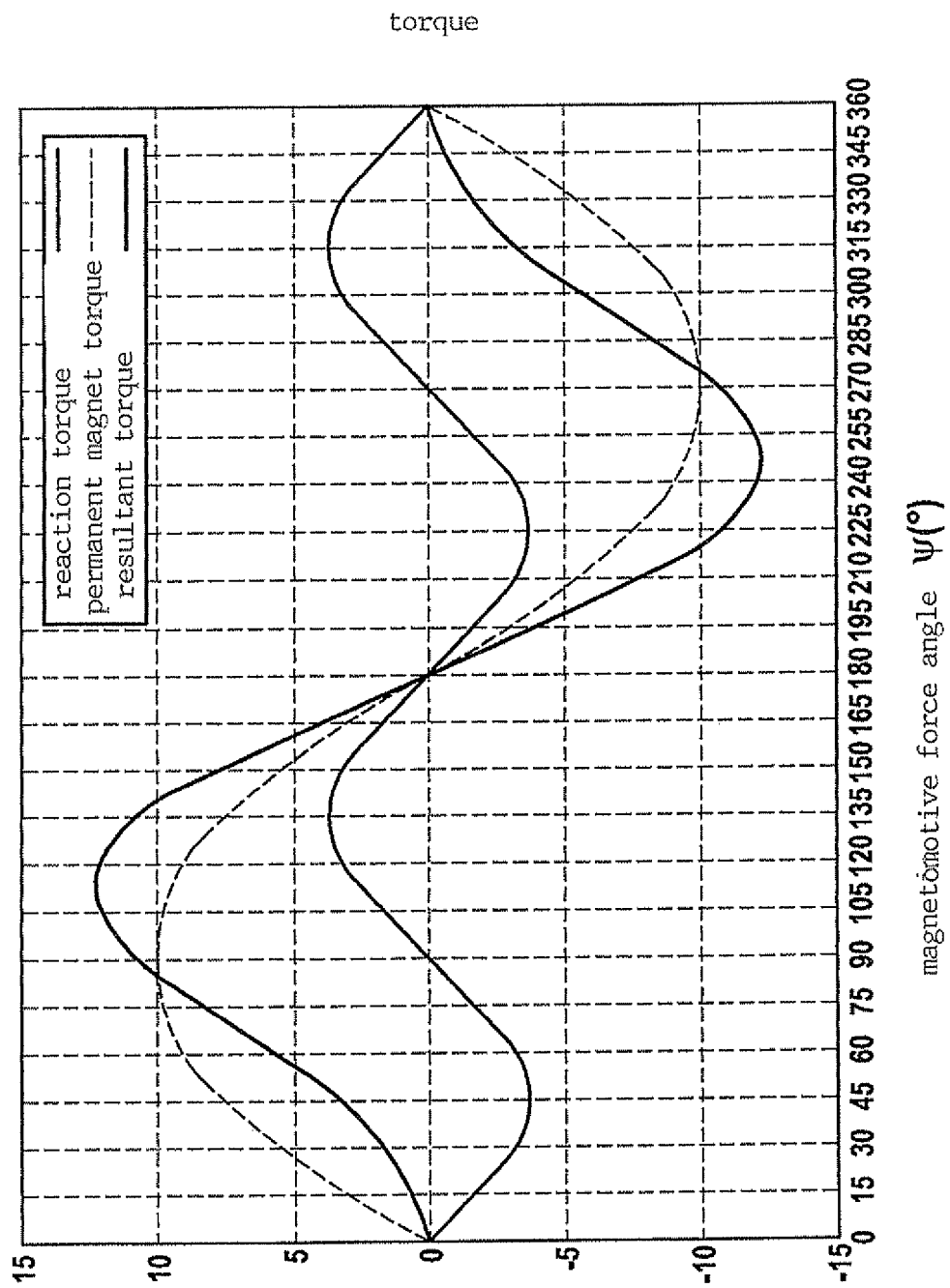
FIG. 5 shows a diagram which illustrates the torque of an electric machine according to FIG. 1 as a function of the magnetomotive force angle φ.

The leading commutation in electrically commutated machines having an asymmetrical magnetization is not just advantageous with regard to the variation of the current over time. The leading commutation also allows use to be made of the reaction torque of such a motor. In this regard, the reaction torque, the permanent magnetic torque, and the resultant torque are illustrated in the diagram in FIG. 5. In contrast to the torque, which is generated by the interaction of the rotor magnets and the stator magnetomotive force and has a periodicity of 360° (electrical rotor position) which has a maximum at a magnetomotive force angle of $\phi=90°$ (electrical rotor position), the reaction torque, which results from the angle-dependent permeance of rotor 6, has a periodicity of 180° (electrical rotor position), the maximum occurring at a magnetomotive force angle of $\phi=135°$ (electrical rotor position). It is apparent that the maximum of the torque shifts to larger magnetomotive force angles $\phi>90°$ (electrical rotor position).

However, if electric machine 2 is to be operated in both rotational directions with the advantage of the reduced power losses, the method of shifting the commutation angular range against the rotational direction is implementable only with an increased level of complexity in control unit 30. The reason is that it is not possible to achieve a symmetrical precommutation for both rotational directions. Rotation by a leading angle in one rotational direction always necessarily results in a lagging rotation angle in the other rotational direction.

In order to now design electric machine 2 for operation with an optimized motor current in both rotational directions, it is therefore provided to situate rotor position sensor 10 in such a way that a change in the rotor position indication takes place in such a way that the corresponding commutation angular range for the electric machine associated by the control unit at an electrical rotor position angle of $$RW = \frac{360°}{p \times m}$$

begins prior to the maximum torque rotor position of the commutation angular range in question, and ends at the maximum torque rotor position of the commutation angular range in question. RW stands for the rotor position angle, p stands for the number of pairs of rotor poles, and m stands for the number of phases of electric machine 2. The resulting shift with respect to normal operation with an average electrically effective magnetomotive force angle of 90° corresponds to exactly one-half the width of a commutation interval, i.e., 30° (electrical rotor position) in the present exemplary embodiment of an electrically effective angle of 60°.

One example of associating the rotor position ranges indicated by rotor position sensor 10 with the individual commutation angular ranges KW is illustrated in the table in FIG. 6a. For each commutation angular range KW, the switching states of semiconductor switches 22, 23 (T1 through T6) are indicated as control patterns associated with the electrical rotor position range in which the switching states are to be adopted. If the configuration of rotor position sensor 10 on electric machine 2 is offset against this rotational direction according to the above-described procedure, the rotational direction opposite thereto may be achieved by shifting the commutation angular ranges and the corresponding control patterns to the right by 1, as illustrated in the table in FIG. 6b. Thus, the unfavorable lag by one-half of a commutation interval, which results from shifting the commutation angular range, in the present exemplary embodiment, by an electrically effective angle of 60° for the opposite rotational direction, is compensated for by shifting the control patterns for semiconductor switches 22, 23 by a commutation range, i.e., in the present exemplary embodiment, by an electrically effective angle of 60°, resulting in an effective leading commutation, also in this rotational direction, by one-half the width of a commutation interval having an electrically effective angle of 60°, i.e., by 30°.

Since in most applications the commutation of electric machine 2 is carried out by a software-controlled microcontroller, the precommutation is very easily implementable by using control tables. The association of the table in FIG. 6a or FIG. 6b is then used in control unit 30 as a function of a rotational direction indication.

It is thus possible to operate an electric machine having a magnetically asymmetrical rotor, at a high efficiency and without appreciable additional complexity, with the aid of an electronic module which in principle has been designed only for the operation of electrically commutated machines having a magnetically symmetrical rotor.

Figure 7A:
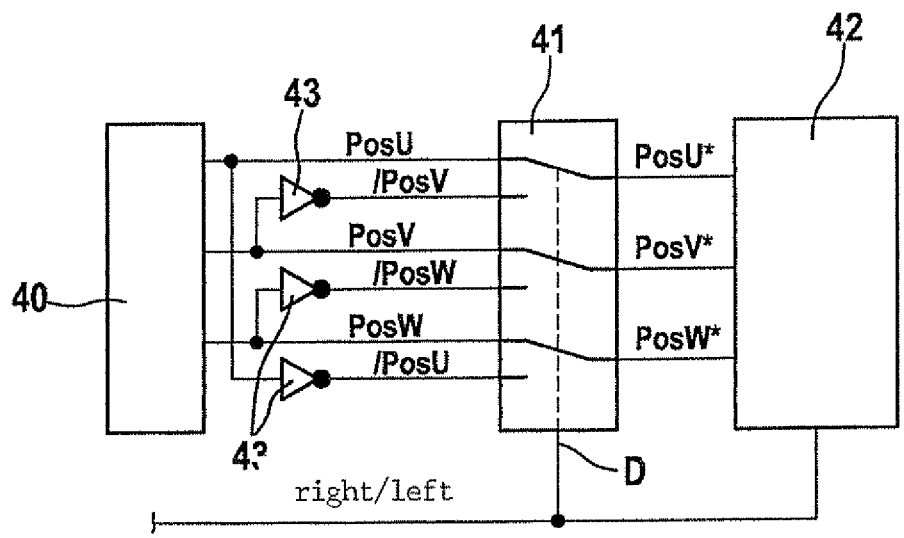
FIG. 7 shows another design for implementing the motor system, having a simple control unit.
Figure 7B:
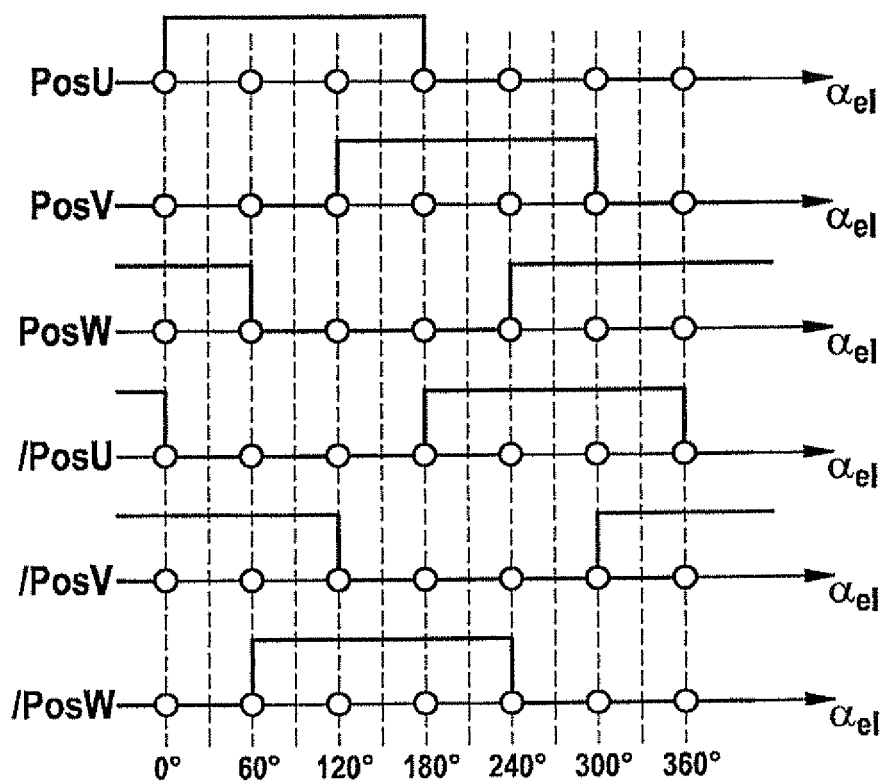

Another specific embodiment is illustrated in conjunction with FIGS. 7a and 7b. FIG. 7a shows a schematic block diagram having a rotor position sensor 40, a multiplexer 41, and a control unit 42 which provides the control signals for the semiconductor switches. As described above, rotor position sensor 40 outputs a rotor position indication which is encoded in three individual rotor position signals PosU, PosV, PosW. This is the case, for example, for rotor position sensors 40, in which a number of sensors is provided which corresponds to the number of phases of the electric machine, the sensors, situated on rotor 6 of electric machine 2, being offset relative to one another by a mechanical rotor position angle of $$RW = \frac{360°}{p \times m}.$$

In the present exemplary embodiment, this mechanical rotor position angle corresponds to 60°, or an electrically effective angle of 120°. Each sensor provides one of the rotor position signals. For a three-phase electric machine having two pairs of rotor poles, a signal pattern is obtained for one rotation of the electric machine by a 360° electrical rotor position (corresponding to a rotation by a 180° mechanical rotor position for two pairs of rotor poles), as illustrated in FIG. 7b. Control unit 42 is designed to associate switching patterns T1 through T6 and to correspondingly control semiconductor switches 22, 23 as a function of rotor position signals PosU, PosV, PosW. In this case control unit 42 may have a very simple design, since it is only necessary to convert the code of rotor position signals PosU, Posy, PosW into switching patterns T1 through T6 for the semiconductor switches, for example using a look-up table or the like.

In this specific embodiment, the shift between the commutation range and the rotor position is carried out by inverting rotor position signals PosU, PosV, PosW and a commutation with the aid of a multiplexer 41. In the present exemplary embodiment, rotor position signals PosU, PosV, PosW are provided in inverted form with the aid of inverters 43 in order to provide either original rotor position signals PosU, PosV, PosW as a function of a rotational direction indication D, or inverted rotor position signals /PosU, /PosV, /PosW, to multiplexer 41 as the rotor position signals to be applied to control unit 42. Instead of rotor position signals PosU, Posy, PosW, inverted rotor position signals /PosW, /PosV, and /PosU are output at the corresponding inputs of control unit 42. Due to the periodicity of the rotor position signals, this corresponds, in a manner of speaking, to an offset of the rotor position indication by the rotor position angle which corresponds to the resolution of rotor position sensor 40, in the present case, by a 60° electrical rotor position. The additional complexity for achieving both rotational directions then involves only providing inverted rotor position signals and multiplexer 41. If the rotor position angular ranges, which may be resolved by rotor position sensor 40, are smaller than the commutation angular ranges, this system may be used in a corresponding manner, since, with the aid of multiplexer 41, the inverted rotor position signals may be provided to control unit 42 in an arbitrary manner.

What is claimed is:

1. A system for operating an electric machine, comprising:
a rotor position sensor situated on the electric machine and configured to provide a rotor position indication as a function of a rotor position angular range which indicates the position of a rotor of the electric machine, wherein a change in the rotor position indication results from a change which occurs between rotor position angular ranges when the rotor moves; and
a control unit configured to control the electric machine by associating a commutation angular range, which indicates a control state for stator coils, with at least one rotor position indication, so that a change in the commutation angular range is triggered by a change in the rotor position indication, and to change an association scheme of associations between the rotor position indications and the commutation angular ranges as a function of a predefined rotational direction indication which indicates a desired rotational direction, wherein:
in each of the commutation angular ranges, a maximum torque rotor position is defined which indicates a rotor position for which the control state associated with the respective commutation angular range results in a stator magnetization having a direction that is perpendicular to a direction of a rotor magnetization; and
the commutation angular ranges are situated between the maximum torque rotor positions, the control beginning at a rotor position which is situated around a commutation angular range which, with respect to the rotational direction, precedes the maximum torque rotor position of the respective control state, and the control ending at a rotor position which corresponds to the maximum torque rotor position.

2. The system as recited in claim 1, wherein the rotor position sensor has a resolution of the rotor position so that each of rotor angular ranges is associated with one of the commutation angular ranges.

3. The system as recited in claim 1, wherein the rotor position sensor has a resolution of the rotor position so that in each case multiple rotor angular ranges are associated with one of the commutation ranges.

4. A system for operating an electric machine, comprising:
a rotor position sensor situated on the electric machine and configured to provide a rotor position indication as a function of a rotor position angular range which indicates the position of a rotor of the electric machine, wherein a change in the rotor position indication results from a change which occurs between rotor position angular ranges when the rotor moves; and
a control unit configured to control the electric machine by associating a commutation angular range, which indicates a control state for stator coils, with at least one rotor position indication, so that a change in the commutation angular range is triggered by a change in the rotor position indication, and to change an association scheme of associations between the rotor position indications and the commutation angular ranges as a function of a predefined rotational direction indication which indicates a desired rotational direction, wherein:
the control unit is designed to: (i) carry out the association of the at least one rotor position indication with a commutation angular range with the aid of a look-up table; and (ii) shift the association of the at least one rotor position indication by at least one commutation angular range against the rotational direction, as a function of the rotational direction indication.

5. The system as recited in claim 4, wherein the control unit is configured to achieve the shift of the association of the at least one rotor position indication against the rotational direction by modifying the rotor position indication.

6. The system as recited in claim 5, wherein:
the rotor position indication is provided by multiple rotor position signals;
the control unit has (i) at least one inverter for inverting at least one of the rotor position signals, and (ii) a multiplexer for commutating the inverted rotor position signal in order to provide the modified rotor position indication.

7. A motor system, comprising:
an electric machine including (i) a stator winding having multiple stator coils situated on a stator of the electric machine, and (ii) a rotor which is driven by an alternating current feed to the stator coils; and
a system for operating an electric machine, including:
a rotor position sensor situated on the electric machine and configured to provide a rotor position indication as a function of a rotor position angular range which indicates the position of a rotor of the electric machine, wherein a change in the rotor position indication results from a change which occurs between rotor position angular ranges when the rotor moves; and a control unit configured to control the electric machine by associating in each case a commutation angular range, which indicates a control state for stator coils, with at least one rotor position indication, so that a change in the commutation angular range is triggered by a change in the rotor position indication, and to change an association scheme of associations between the rotor position indications and the respective commutation angular ranges as a function of a predefined rotational direction indication which indicates a desired rotational direction; wherein the control unit is designed to: (i) carry out the association of the at least one rotor position indication with a commutation angular range with the aid of a look-up table; and (ii) shift the association of the at least one rotor position indication by at least one commutation angular range against the rotational direction, as a function of the rotational direction indication.

8. A method for operating an electric machine including (i) a stator winding having multiple stator coils situated on a stator of the electric machine, and (ii) a rotor which is driven by an alternating current feed to the stator coils, the method comprising:

providing a rotor position indication as a function of a rotor position angular range which indicates the position of a rotor of the electric machine, wherein a change in the rotor position indication results from a change which occurs between rotor position angular ranges when the rotor moves;

associating a commutation angular range, which indicates a control state for stator coils, with at least one rotor position indication, so that a change in the commutation angular range is triggered by a change in the rotor position indication with the aid of a look-up table; and changing the associations between the rotor position indications and the commutation angular ranges by at least one commutation angular range against the rotational direction, as a function of a predefined rotational direction indication which indicates a desired rotational direction.

* * * * *